(12) United States Patent
Wermeister et al.

(10) Patent No.: US 6,929,428 B1
(45) Date of Patent: Aug. 16, 2005

(54) CUTTING INSERT AND CUTTING INSERT HOLDER THEREFOR

(75) Inventors: Günter Wermeister, Meerbusch (DE); Heinz Götz-Werner, Düsseldorf (DE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/018,085

(22) PCT Filed: May 25, 2000

(86) PCT No.: PCT/EP00/04757

§ 371 (c)(1),
(2), (4) Date: Mar. 21, 2002

(87) PCT Pub. No.: WO00/76707

PCT Pub. Date: Dec. 21, 2000

(30) Foreign Application Priority Data

Jun. 16, 1999 (DE) .................. 199 27 545

(51) Int. Cl.⁷ ................................ B23C 5/20
(52) U.S. Cl. .......................... 407/113; 407/34
(58) Field of Search ............... 407/34, 40, 42, 407/51, 53, 55, 43, 61, 113

(56) References Cited

U.S. PATENT DOCUMENTS

| | | | | |
|---|---|---|---|---|
| 3,701,187 A | * | 10/1972 | Erkfritz | 407/46 |
| 4,056,872 A | * | 11/1977 | Seidel | 407/114 |
| 5,032,049 A | * | 7/1991 | Hessman et al. | 407/113 |
| 5,207,538 A | * | 5/1993 | Satran | 407/113 |
| 5,800,100 A | * | 9/1998 | Krenzer | 408/224 |
| 5,924,826 A | * | 7/1999 | Bystrom et al. | 407/103 |
| 5,944,456 A | * | 8/1999 | Shirley et al. | 407/42 |
| 6,053,672 A | * | 4/2000 | Satran et al. | 407/40 |
| 6,168,356 B1 | * | 1/2001 | Sjoo et al. | 407/104 |
| 2002/0098360 A1 | * | 7/2002 | Okamura et al. | 428/408 |

FOREIGN PATENT DOCUMENTS

| | | | |
|---|---|---|---|
| JP | 7060509 | * | 3/1995 |
| WO | 99/28073 | | 6/1999 |

* cited by examiner

*Primary Examiner*—Derris H. Banks
*Assistant Examiner*—Dana Ross
(74) *Attorney, Agent, or Firm*—Burns, Doane, Swecker & Mathis, LLP

(57) ABSTRACT

A milling cutter for machining camshafts includes a rotary disc and an annular row of cutting bits mounted in pockets formed in the disc. Each cutting bit includes a top surface having a pair of diagonally spaced raised portions. Cutting edges are formed where the top surface and the raised portions intersect side surfaces of the bit. The pockets are arranged along an edge of the disc where a cylindrical outer periphery of the disc intersects an end face of the disc. Each pocket is configured with an internal cavity for receiving a raised portion of an inactive cutting portion of the respective bit.

21 Claims, 7 Drawing Sheets

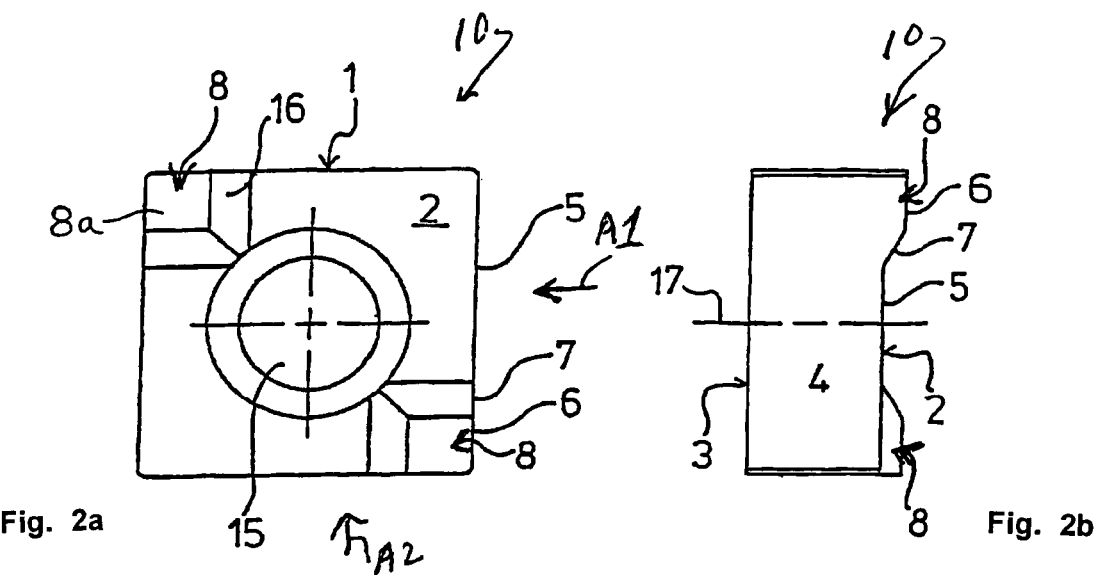
Fig. 2a
Fig. 2b
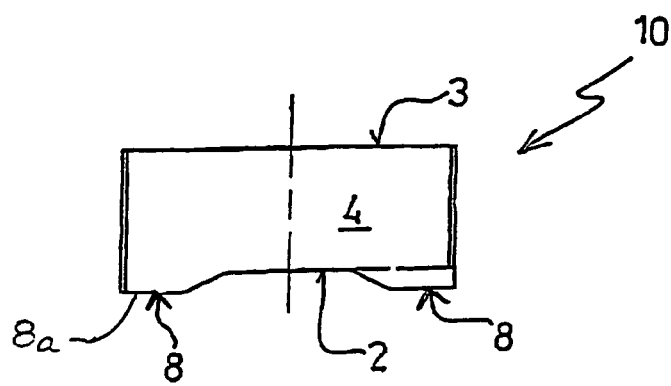
Fig. 2c

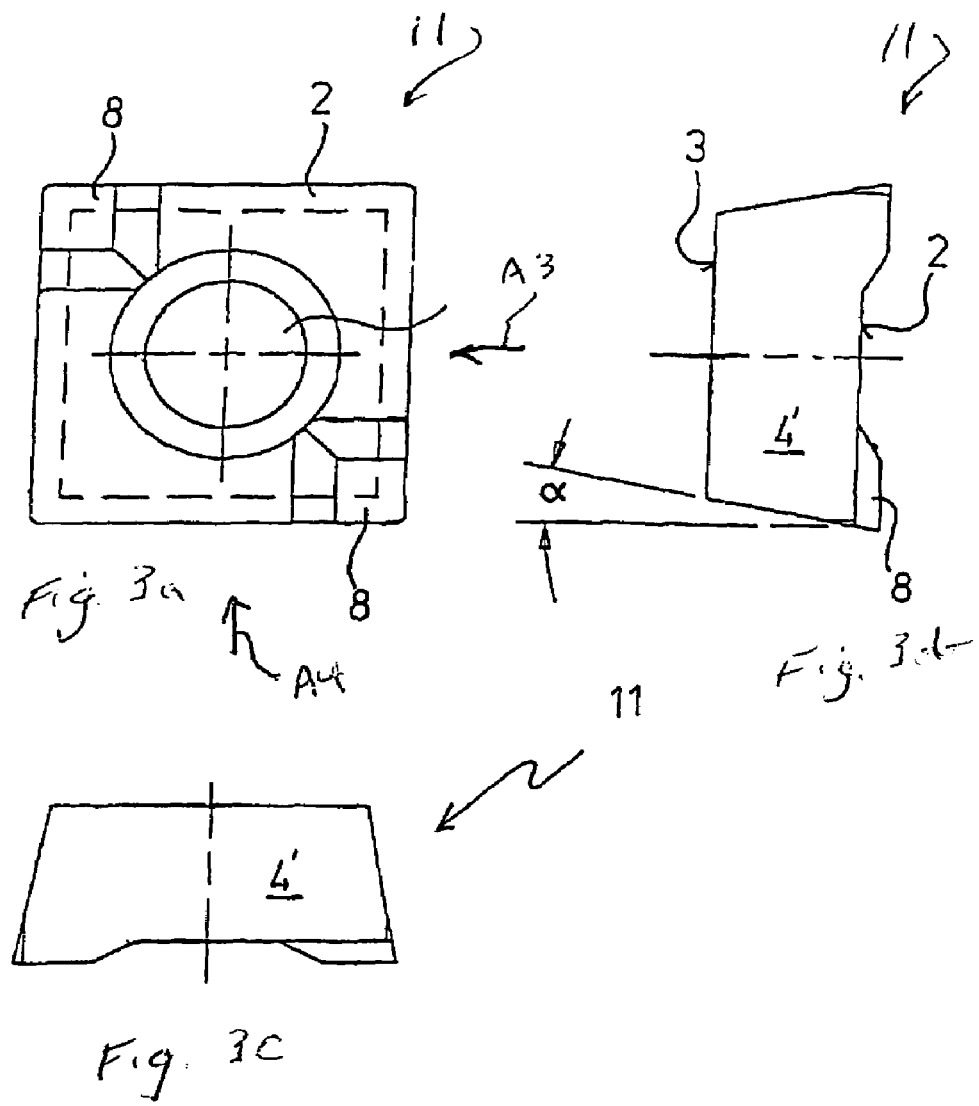

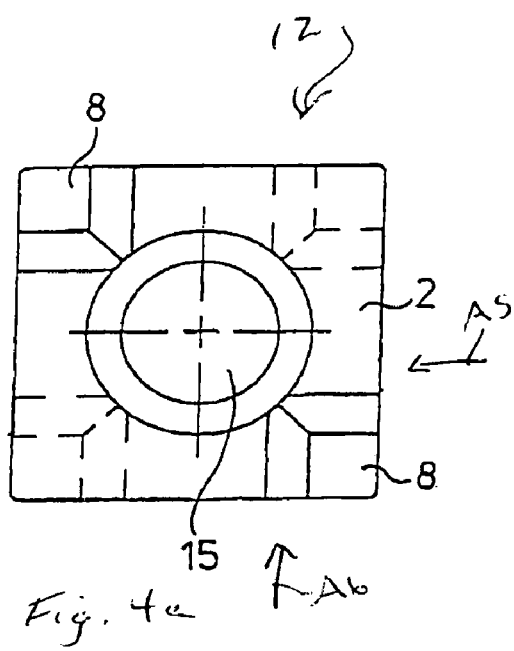
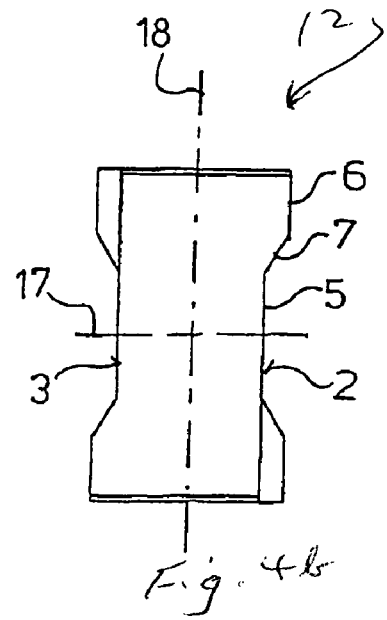
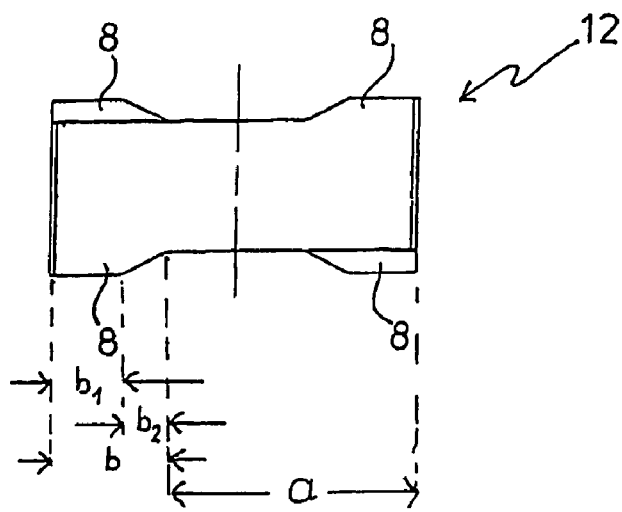
Fig. 4

CUTTING INSERT AND CUTTING INSERT HOLDER THEREFOR

BACKGROUND OF INVENTION

The present invention concerns a cutting bit for camshaft milling cutters and a corresponding disc milling cutter for camshaft milling. Corresponding cutting bits are already known in the state of the art, which comprise a substantially cuboidal cutting body with an upper face and a lower face oriented substantially parallel to one another and which have side faces. Cutting edges are formed along the lines of intersection of side faces with the top side and/or the underside.

The cutting bits can be rectangular, preferably square in plan view. When mutually oppositely disposed side faces of such cutting bits extend substantially parallel to each other, that generally involves a negative rake angle, by virtue of the necessity for providing a relief surface behind the cutting edge. Cutting bits or cutting inserts of that kind are therefore also referred to for the sake of brevity as "negative cutting bits".

If the upper face is smaller than the lower face or vice-versa, then a cutting edge involving positive cutting geometry can be provided at the transition of the side faces which are then correspondingly inclined, in relation to the respective larger one of the upper and lower faces. The cutting bits according to the present invention can be both positive and negative cutting bits or inserts.

Rectangular or preferably square cutting bits of that kind are particularly extensively used on milling cutter heads for milling crankshafts and camshafts. For that purpose, suitable cutting bits are arranged along the periphery of a cylindrical main portion of a disc milling cutter and such a disc milling cutter is then caused to rotate about its axis and is moved in a radial direction towards a crankshaft or camshaft which can possibly also be rotated about a longitudinal axis so that wide grooves are milled out of an initially relatively thick, solid metal shaft, in individual regions thereof, and the remaining parts thereof are profiled so that the overall result is the desired profile of a camshaft or also a crankshaft.

In that respect, particularly when dealing with camshafts, the situation very regularly sees the occurrence of a special profile shape which is provided between two spaced-apart grooves on a cam which can also be present in the form of an eccentrically displaced, cylindrical part. That profile is characterized by beveling or chamfering of the edges, wherein a cylindrical part of slightly smaller diameter again adjoins one of those chamfers.

Such a profile can be seen on the part of a camshaft as is illustrated in FIG. 1 at reference numeral 30 for two cylindrical, non-coaxial parts of a camshaft.

In this case, those parts do not necessarily have to be cylindrical but they can be of a cam contour which in principle can be any desired contour and which deviates from a circular shape which however is not visible in the view shown in FIG. 1.

The production of corresponding profiles is relatively complicated and expensive with the cutting bits and milling cutter heads known in the state of the art, and conventionally, to produce a profile corresponding to the profile of the cam 30 in FIG. 1, milling cutter heads with two displaced rows of cutting bits are used in order to produce the cylindrical part while two further rows of bits are used for producing the chamfers or bevels and the short cylindrical attachment portion. Therefore, if such profiles are to be produced in one pass, it is necessary to provide mounting devices for four different rows of cutting bits along the periphery of a disc milling cutter which is in the basic shape of a cylindrical disc. Unless various types of cutting inserts are also to be used for that purpose, such a disc milling cutter must have four different and in particular differently oriented rows of mounting pockets for suitable cutting bits. As moreover the cutting regions of such cutting bits must necessarily overlap in order to cover the entire profile, all those various cutting bit mountings have to be displaced relative to each other in the peripheral direction along the outside periphery of a disc milling cutter, which in turn means that the cutting bits which are to produce one and the same part of the profile must be at relatively large spacings relative to each other. That reduces the capacity and efficiency of corresponding milling cutters. Alternatively, it would be possible for the various parts of the profile to be produced in a plurality of working operations involving various milling cutter heads, which however is detrimental in terms of efficiency of production.

In comparison with that state of the art, the object of the present invention is to provide a cutting bit and a corresponding disc milling cutter which are simpler to produce and by virtue of the use of which, it is possible to produce cam profiles with a straight main part (for example cylindrical) which is parallel to the axis, bevels at the edges and/or at one or both sides extension portions of smaller diameter, at a higher level of efficiency.

SUMMARY OF THE INVENTION

In terms of the cutting bit that obtain is attained in that the upper face and/or the lower face have at diagonally oppositely disposed corners raised corner regions which project above the plane of the respective upper face and lower face respectively and which extend as far as the side faces so that the cutting edges are at least partially formed by the lines of intersection of the side faces with the surfaces of the raised corner regions.

In other respects the remaining part of the cutting edges is formed in conventional manner between the line of intersection between an upper face or a lower face and the respective side faces. The cutting edge therefore comprises two cutting edge regions with in principle any transitional region therebetween, the cutting edge regions being displaced in the direction of the thickness of the cutting bit (thickness=spacing between the upper and the lower faces).

If bevels or chamfers of edges are to be produced on the cam profile, then the transitional region should entail a corresponding inclination of the bevel face.

Such a cutting bit can be arranged at the periphery of a disc milling cutter in such a way that, apart from tilting through a relief angle which is to be set, the upper and the lower faces respectively are disposed parallel to a plane which is perpendicular to a radius vector, facing towards the cutting bit, of the cylindrical disc milling cutter. That means that the cutting edge part which is formed in the raised corner region of a cutting bit is at a somewhat greater spacing from the axis of the cylinder of the disc milling cutter than the remaining part which is formed between the upper and lower faces respectively and the side face, wherein at least the last-mentioned cutting edge part extends parallel to the axis of the disc milling cutter.

The transition between the cutting edge part in the raised region and the remaining region of the cutting bit extends across that differing radial spacing from the axis of the cylinder of the disc milling cutter and thus, when milling a camshaft profile, it produces the beveled part in the edge region of a cam.

If, as is provided in the preferred embodiment of the invention, the cutting bits according to the invention are of a mirror-image symmetrical configuration in relation to a diagonal (in plan view onto the upper or lower face), preferably being of a mirror image symmetry configuration in relation to both diagonals, then the cutting edge parts formed by the raised region, along adjacent side faces, are of respectively equal length, and the transitional regions are also of respectively equal length and involve the same inclination. This means that, when the cutting bit is turned through 90° about an axis perpendicular to the upper and lower face, the relative arrangement of the raised region and the remaining cutting edge part is merely interchanged and accordingly a mirror-image profile is produced. Therefore, simply by turning the cutting bit through 90°, it is possible to use one and the same cutting bit both for the right-hand edge or bevel profile and also for the left-hand edge or bevel profile of a cam. If the raised region has a surface which is substantially parallel to the upper or lower face respectively of the cutting insert, then the cutting edge part provided thereon is operative to form a part of the cam face which is parallel to the main face of the cam but is of a smaller radius, that is to say for example the radius of the short cylindrical projection portion 36 in FIG. 1.

Preferably, the cutting bits according to the invention are arranged along the two edges of a milling tool in the form of a cylindrical disc in mounting pockets which are arranged in mutually displaced relationship, in such a way that the raised regions respectively form the radially outward and also axially furthest outwardly disposed portions of the milling tool. That overall affords a profile as is shown at top right in FIG. 1 in the form of a cutting profile 38 projecting over the cam profile. When the cutting bits are arranged in that way moreover the side faces respectively adjoining a cutting edge act as rake faces, in contrast to the conventional use of corresponding cutting bits in which the top side and the underside are each in the form of rake faces.

If the raised corner regions are provided at the top side and the underside of the cutting bit, then a total of eight usable cutting edges are available on each cutting bit, which cutting edges by rotation of the cutting bits through 90° about an axis extending perpendicularly to the upper and lower faces or about an axis extending perpendicularly to two side faces can be moved into their active cutting position, whereby firstly four of those cutting edges can be used and finally the cutting bits, after rotation through 90° about the above-mentioned axis, along the one edge of the disc milling cutter in the form of the cylindrical disc, can also be replaced by those of the other edge, in which case then also the four remaining cutting edges can be successively moved into the active position by suitable rotation.

It will be seen that in that way it is possible to employ a single type of cutting bit and to make use thereof in a highly effective manner as each of those cutting bits has eight usable cutting edges. If however the desire is to provide the cutting edges only at the transition of the side faces to the upper face, there are still four cutting edges available by the cutting bits being turned or interchanged, and those cutting edges in their entirety always form the desired profile.

If the arrangement is restricted to cutting edges along the periphery of the upper face (and the associated corner regions), it is also possible to impart a positive cutting geometry to the cutting bit by the side faces being inclined, thereby forming a truncated pyramid shape. In that case, it is possible to provide a positive rake angle at the cutting edge, in spite of maintaining a suitable relief angle.

It will be appreciated that the width of a corresponding disc milling cutter is matched to the overall length of the cutting edges of the corresponding cutting inserts so that those cutting edges of the two different rows of cutting bits which are arranged along the respective edges of a milling cutter body in the form of a cylindrical disc overlap each other in the axial direction so that it is possible to produce the entire cam profile shown in FIG. 1.

It will be appreciated however that the production of different profile shapes from those shown in the Figures is also made possible by differently shaping the raised regions, for example not in the form of a flat face parallel to the upper and lower face respectively.

It will further be appreciated that the size of the cutting bits or the length of the respective cutting edges and the corresponding width of the disc milling cutter are matched to the profile which is to be specifically produced. In that respect however it is entirely possible to produce the same cam profile in different widths (or of different axial lengths) by using milling cutter heads of different widths or by virtue of different depths for suitable mounting pockets for the cutting bits, with one and the same type and one and the same size of cutting bits. In particular the cutting bits can be secured to the disc milling cutter axially displaceably (if necessary also radially displaceably or rotatably through small angles).

Desirably, the mounting devices or the mounting pockets on a disc milling cutter are adapted to receive a basically cuboidal cutting bit body, that is to say they have essentially three mutually perpendicular support faces of which one support face (apart from a relief angle which is to be set) is arranged substantially perpendicularly to a radius vector of the disc milling cutter, which faces towards that mounting pocket, one wall of the mounting pocket is in a plane substantially perpendicular to the axis of the disc milling cutter, and the third one (once again apart from tilting to produce a relief angle) is substantially parallel to a plane which is defined by the axis and the radius vector facing towards the mounting pocket.

In that respect, at least when using double-sided cutting bits, that is to say cutting bits which have cutting edges at the transition of the side faces both to the upper face and also to the lower face, at least the contact face which is approximately parallel to the radius vector should have an opening to receive the raised corner region of a cutting bit. That makes it possible moreover for the cutting bit to bear over a large area against the faces of appropriate mounting pockets and makes it possible for the raised regions and the cutting edges provided thereon not to be loaded in their non-active position within the mounting pockets.

BRIEF DESCRIPTION OF THE DRAWINGS

Further advantages, features and possible uses of the present invention will be clearly apparent from the description hereinafter of a preferred embodiment and the Figures relating thereto, in which:

FIG. 2a shows a top view of a first embodiment of a cutting bit having four negative cutting edges, according to the present invention.

FIG. 2b shows a side view of FIG. 2a taken in the direction of arrow A1.

FIG. 2c shows a side view of FIG. 2a taken in the direction of arrow A2.

FIG. 3a shows a top view of a second embodiment of a cutting bit having positive cutting edges, according to the present invention.

FIG. 3b shows a side view of FIG. 3a taken in the direction of arrow A3.

FIG. 3c shows a side view of FIG. 3a taken the direction of arrow A4.

FIG. 4a is a top view of a third embodiment of a cutting bit, which is double-sided and has eight usable cutting edges, according to the present invention.

FIG. 4b is a side view of FIG. 4a taken in the direction of arrow A5.

FIG. 4c is a side view of FIG. 4a taken in the direction of arrow A6.

DETAILED DESCRIPTION OF PREFERRED EMBODIMENTS OF THE INVENTION

Figure 1:
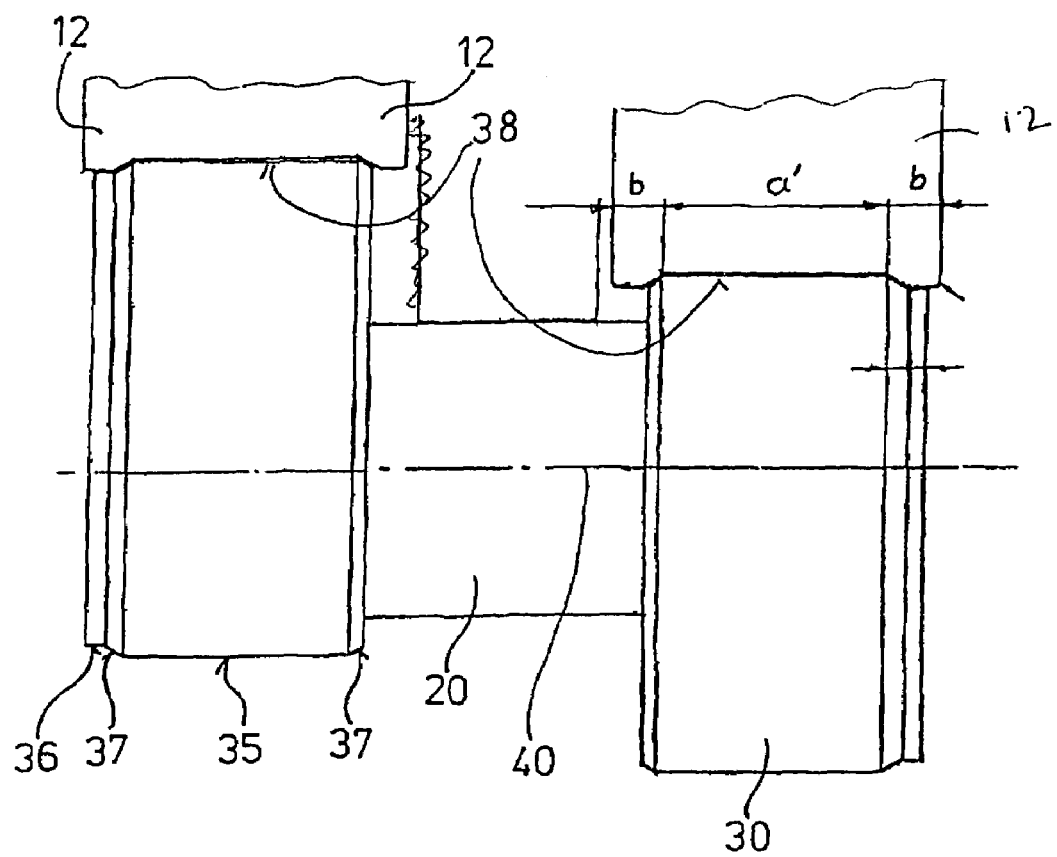
FIG. 1 shows a part of a camshaft having two cylindrical, non-concentric cams of a given cam profile being cut by two cutting bits according to the present invention.
Figure 5:
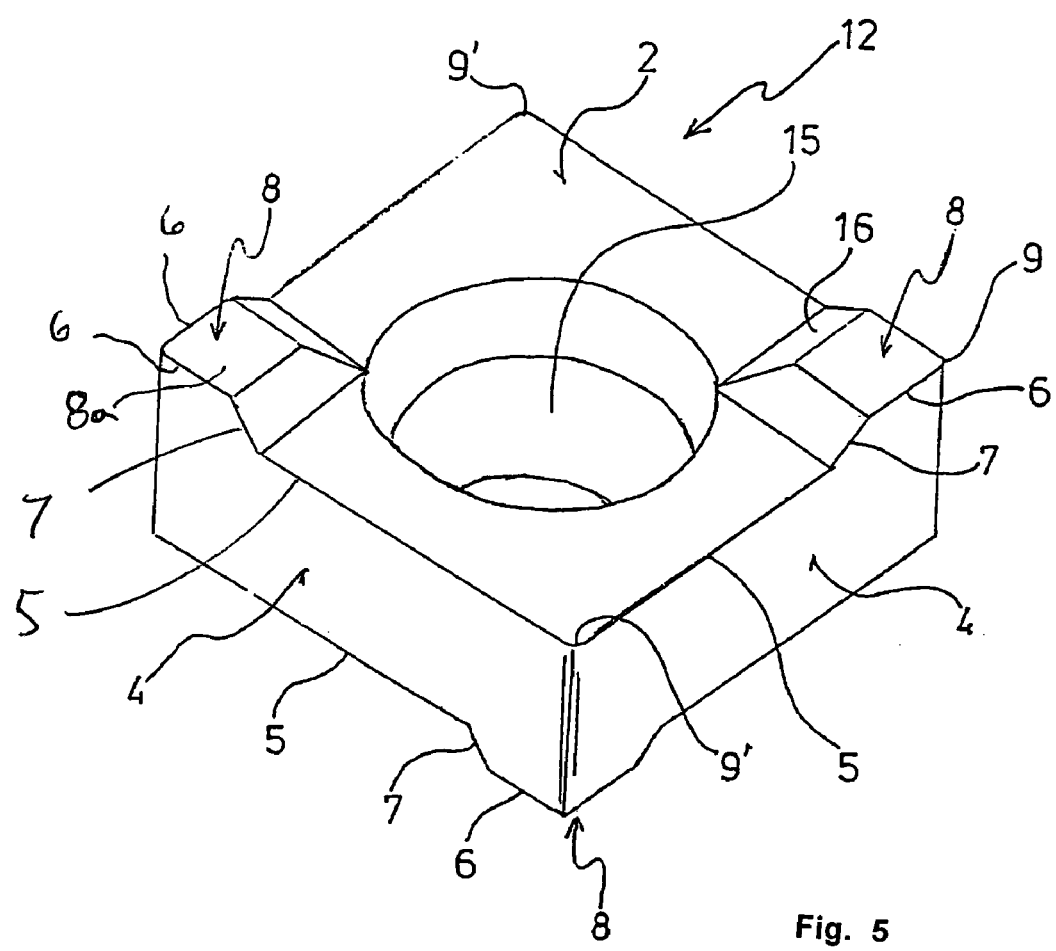
FIG. 5 shows a diagrammatic perspective view of the cutting bit of FIG. 4.

Referring to FIG. 1, shown therein is a more or less diagrammatically illustrated part of a camshaft, with a shaft axis 40 and a cylindrical shaft part 20 which is concentric thereto. That cylindrical shaft part 20 is firstly produced independently of the cam contour by milling or turning.

Shown on both sides of the cylindrical shaft part 20 are cams 30 which in terms of their profile are in mirror image relationship with each other but in other respects are identical in configuration, while however being displaced in a radial direction in opposite directions with respect to the shaft axis 40.

The cams 30 can be circular in axial view thereonto, but they may also be of another peripheral contour. The cams 30 comprise a cylindrical main part 35 whose edges are beveled on both sides along bevel faces 37. Also adjoining the bevel 37 at one side is a respective cylindrical part 36 which is of somewhat smaller diameter than the cylindrical main part 35 and which is also shorter. In the case of non-cylindrical cams, the contour which can be seen in FIG. 1 is the same and the parts 35 and 36 are then of the same non-cylindrical contour in each case with the same stepped configuration or diametral difference.

It will be appreciated that the camshaft generally has more than two cams and more than one cylindrical part and that it can be envisaged as being correspondingly supplemented and extended in both axial directions. In that respect the individual cams 30 may also be eccentrically displaced in different directions with respect to the shaft axis 40.

The above-described cam contour occurs very frequently and on a regularly recurrent basis in camshafts. Conventionally, that contour could be produced only with a plurality of various cutting bits and often only in a plurality of working operations with separate milling cutters. Use of the cutting bits in accordance with the present invention, as are shown by way of example in FIGS. 2a–c, 3a–c, 4a–c, and 5, in conjunction with a disc milling cutter as is diagrammatically illustrated in FIGS. 6 and 7, now makes it possible to produce the illustrated contour in a single working operation with a single milling tool and a single type of cutting bit. By way of example, FIG. 1 shows the contour of two cutting bits 12 which are arranged in mirror image with respect to each other, wherein portions of the common cutting edge contour of both cutting bits 12 precisely involve or produce the desired profile of the cam 30. The mirror-image arrangement of two such cutting bits 12 is easily achieved by turning a cutting bit about its central axis through 90°, as will be described again hereinafter.

The cylindrical main part 30 is of an axial length a' which in principle can be varied as desired, only as long as it is less than the sum of the lengths a of the two straight cutting edge parts 5 of two cutting bits 12 (see FIG. 4c).

FIGS. 2a–c show as a first embodiment of the invention a cutting bit 10 as can be used for producing corresponding contours. The cutting bit 10 comprises a substantially cuboidal main portion 1 with an upper face 2 and a lower face 3 which are substantially parallel to each other and of a square configuration. Provided at two diagonally oppositely disposed corners of the upper face 2 are respective raised regions 8 whose top surface 8a is substantially parallel to but displaced in relation to a remaining non-raised portion of the upper face. Inclined transitional faces 16 form the transition from the upper face 2 to the top surface of the raised region 8. Also shown at the center of the cuboidal main portion 1 (in FIG. 2a) is a central fixing bore 15 which is conically enlarged in its upper region to receive a screw head.

A non-raised cutting edge part 5 is formed by the transition between each side face and the non-raised portion of the upper face 2. A non-raised cutting edge part 6 is formed by the transition between each side face 4 and a respective top face 8a. A transitional cutting edge part 7 is formed by the transition between each side face 4 and a respective transitional face 16. The profile configuration of the cutting edge parts 5, 6 and 7 can best be seen from FIG. 2b which is a view along arrow A1 onto the cutting bit shown in FIG. 2a. It is to be noted in this respect that the raised region 8 which can be seen at the bottom in FIG. 2b is displaced rearwardly with respect to the plane of the paper, so that the cutting edge profile 5, 6 and 7 in FIG. 2b approximately corresponds to half of the profile shown in FIG. 1. The other half of that profile is obtained simply by turning the cutting bit through 90° about the central axis 17, in which case then an adjacent side face 4 forms corresponding side edge parts with the top side 2 of the cutting bit or with the raised region and the transitional face so that overall the profile which is mirrored at the axis 17 in relation to FIG. 2b appears, in which case the working region of the cutting edge parts 5 overlaps more or less if the condition a'<2a is satisfied.

In connection with FIG. 6 this description will also explain hereinafter how, by suitably tilting the cutting bits 10, 11 or 12, it is ensured that only the respective forwardly disposed cutting edge parts 5, 6 and 7 come into engagement with the surface of the cam to be produced, while the further rearwardly disposed second raised corner region 8 of that cutting bit does not come into contact with the surface of the workpiece as long as that raised corner region is not rotated into an active position.

In the present case however, in contrast to conventional cutting bits, the rake face is not defined by for example the surface 2. Rather during use of corresponding cutting bits in accordance with the invention the chips go away along the side faces (rake faces) 4 while portions of the surface 2, like the upper (top) side 8a of the raised region 8 and the corresponding transitional face 16, respectively form relief surfaces.

In that respect, if there is a wish to prevent the respectively rearward raised region from coming into contact with the surface of the workpiece, the cutting bit has what is referred to as negative cutting geometry, that is to say the rake face which adjoins the cutting edge and which is formed by one of the side faces 4 forms a negative rake angle with respect to a line perpendicular to the produced surface of the workpiece.

FIG. 3 shows a cutting bit 11 in which the lower face 3 is smaller than the upper face 2, with the cutting edges being formed at the transition thereof to the side faces 4'. By virtue of that fact, the side faces 4' are inclined through an angle of inclination a with respect to the upper face 2 and the lower face 3 and overall define the face of a truncated pyramid (see FIG. 3c which shows a side view of the cutting bit 11 shown in FIG. 3a).

In that respect, in order to have a positive cutting geometry, the angle a must be larger than a tilt angle b which is to be described hereinafter and which ensures that the respectively rearward raised region 8 does not come into engagement with the surface of the workpiece.

FIGS. 4a–c and 5 show a cutting bit 12 in which the upper face 2 and the lower face 3 are substantially identical. In that case the upper face 2 precisely corresponds to the upper face 2 shown in FIG. 2 while the lower face 3 is of precisely the same structure and differs in that respect from the lower face 3 of the cutting bit shown in FIG. 2. For use when milling a cam profile, there is only ever one set of cutting edge parts 5, 6 and 7 that come into engagement with the surface of the workpiece. Overall, there are eight such cutting edge sets available on the cutting bit 12, more particularly in each case four involving a given orientation of the raised parts 8 relative to the remaining regions. For example the view shown in [FIG. 4b is also achieved by turning the cutting bit 12 about the axis 17 and about the axis 18 in each case through 180°, which each time results in the same view as shown in FIG. 4b which is thus to be achieved in four different positions (with in each case four different sets of active cutting edge parts 5, 6 and 7) of the cutting bit. The arrangement which is of a mirror image configuration for that purpose and in which the raised regions which can be seen at bottom right and bottom left in FIG. 4b are not disposed at the rear but at the front and conversely the raised regions 8 which can be seen at top right and bottom left are behind the plane of the paper, is achieved by rotation through 90° about the axis 17, whereupon then the same view can again be reproduced by rotation through 180° about the axis 17 or about the axis 18 or about both.

In that respect FIG. 4b corresponds to a view toward FIG. 4a along arrow A5, and FIG. 4c corresponds to a view toward FIG. 4a along arrow A6.

It will be appreciated that because the upper face 2 is of an identical configuration to the lower face 3 the conical recessing of the fixing bore 15 is also provided from both sides.

As can also be seen from FIGS. 4a to 4c, the raised regions 8 on the underside 3 are arranged in relation to the raised regions 8 at the top side 2 by a 90°-displacement, i.e., in mutually diagonally opposite corners of the cutting bit 12 which is square in plan. However, they could also readily be arranged at the same respective corners without this in any way adversely affecting the use of those cutting bits 12.

FIG. 5 once again shows a perspective view of the cutting bit 12 illustrated in FIG. 4, but without any intention here to provide a true-to-scale view of such a cutting bit. It will be clearly seen from this perspective view that, depending on the respective orientation of the cutting bit and by rotation through 90° about the axis (not shown) through the bore 15, it is possible to interchange the relative orientation as between the cutting edge parts 5 and 6 so that the profile shown in FIG. 1 can be readily embraced, with two successively arranged cutting bits.

Figure 6:
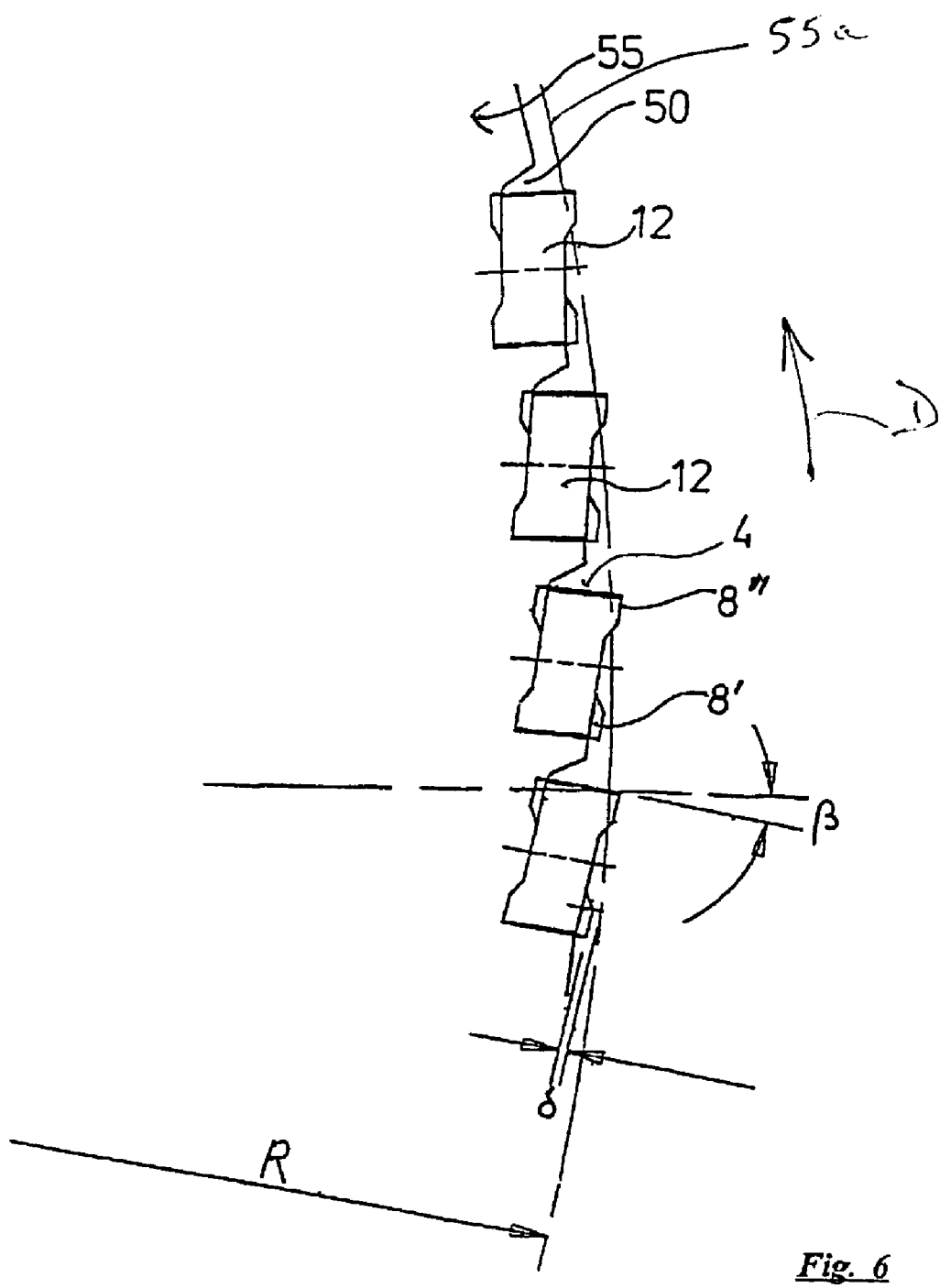
FIG. 6 shows a section of a disc milling cutter having a plurality of cutting bits as shown in FIG. 4 which are arranged thereon and accommodated in suitable openings.

FIG. 6 shows a disc milling cutter 55 with a row of cutting bits 12 arranged thereon. The milling tool is a relatively large cylindrical disc 55 having seats in the form of mounting pockets 50 for the individual cutting bits 12. The design configuration in principle of the mounting pockets 50 can be seen from FIG. 7. R denotes the radius which is to produce the cylindrical contour 35 of a cam 30, that is to say the radial position of the cutting edge part 5 which extends parallel to the axis of the disc milling cutter 55. In a corresponding manner, the raised regions 8 with the cutting edge parts 6 project in a radial direction somewhat beyond that radius R, with the cutting edge part 7 forming the join between the parts 5 and 6.

As can also be seen from FIG. 6, the cutting bits 12 are tilted with respect to the peripheral surface 55a of the cylindrical disc 55 (or in other words, with respect to a plane perpendicular to the respective radius vector), through the angle β which ensures that the rearward raised corner region 8' is within the radius which is cut by the cutting edge part 5, and the forward raised corner region 8" is outside of the radius R and does the cutting. In the orientation illustrated here, the cylindrical disc 55 rotates in the counter-clockwise direction D about an axis which is perpendicular to the plane of the paper and from which the radius vector R extends.

If the positive cutting bits 11 are used instead of the cutting bits 12, it is to be noted that the tilt angle b is smaller than the angle of inclination a shown in FIG. 3 for the side faces 4' relative to the upper face 2 of the cutting bit 11 if a positive cutting geometry is to be guaranteed.

With the orientation shown in FIG. 6, the side face which is identified by way of example with reference numeral 4 on one of the cutting bits 12 is the rake face of the cutting edge parts 5, 6 and 7 which are just active at that time and which are extending substantially perpendicularly to the plane of the paper.

It will be appreciated that the mounting pockets 50 for the individual cutting bits are of such a design configuration that the chips produced can be easily carried away.

Figure 7:
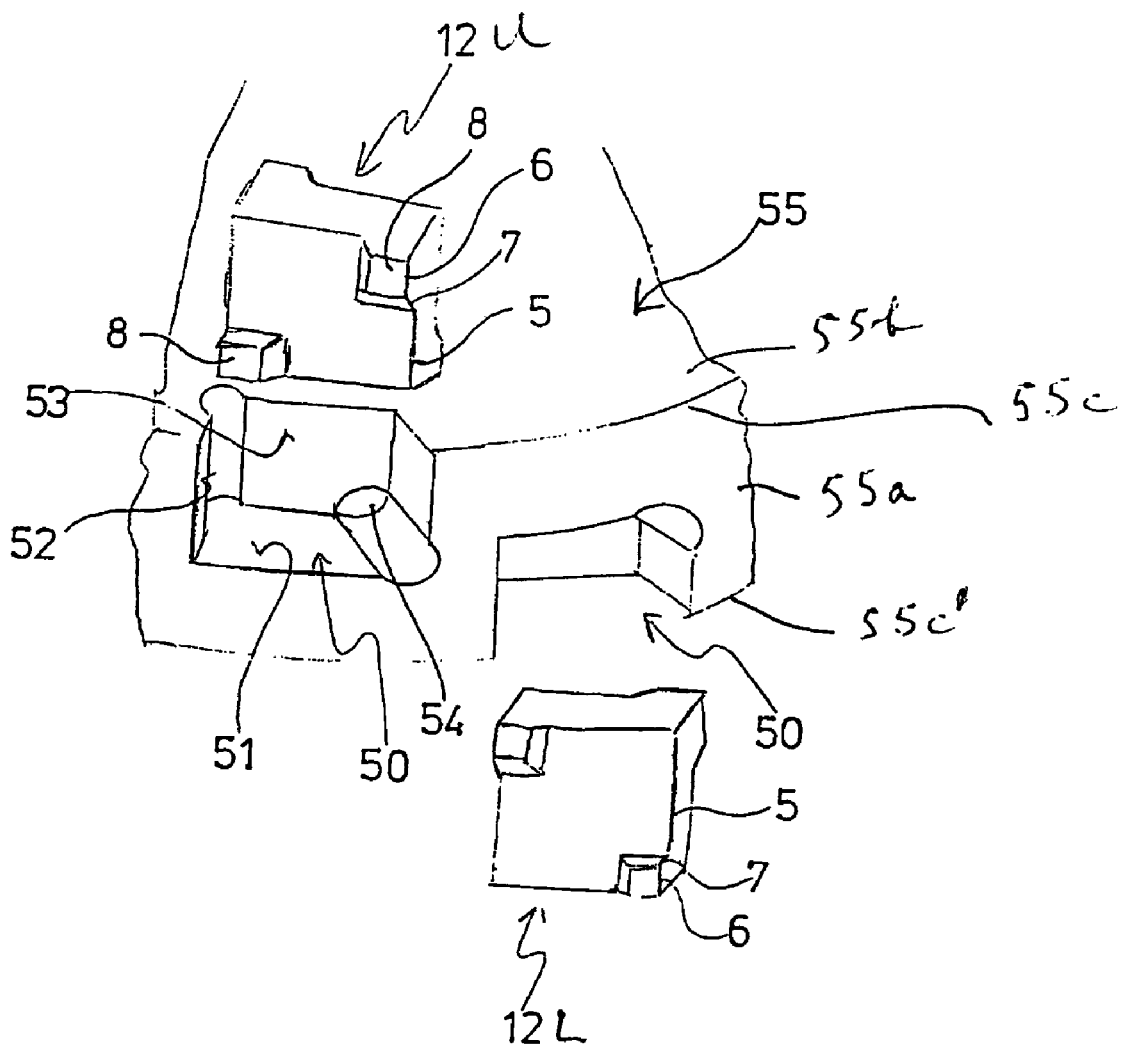
FIG. 7 is a perspective view of two mounting pockets in a disc milling cutter for cutting bits as shown in FIGS. 4a–c and 5a–c.

A section from a disc milling cutter 55 with the corresponding mounting pockets 50 is diagrammatically shown once again in FIG. 7, together with upper and lower cutting bits 12a and 12b which are illustrated thereabove and there beneath respectively and which are to be respectively arranged therein, in the respectively required orientation. The bits 12a are mounted in pockets 50 that are formed in an edge 55c defined by the intersection of the peripheral surface 55a with an end face 55b of the disc. The bits 122 are mounted in pockets 50 formed in an edge 55c' defined by the intersection of the peripheral surface with an opposite end face. The mounting pockets 50 essentially have three mutually perpendicularly disposed side walls 51, 52 and 53, wherein the side walls 51 and 52 come into engagement with two adjacent side faces 4 of a cutting bit 12a while the side face 53 comes into engagement with a top side 2 or an underside 3 of the cutting bit 12a. Not shown in this case are the fixing bores 15 for the cutting bits 12a and the corresponding screw threaded bores which are provided in the walls 53.

As will also be seen, the face 53 is also provided with an additional opening 54 in which the respective corner region 8 of the cutting bit 12a, which is present in that region, can be received. The opening 54 is desirably produced by a suitable bore which—disregarding the fact that the structure is not shown true to scale in FIG. 7—is in any event of such a dimension that the raised corner region 8 disposed there can be received completely in the opening 54. The corner at the transition of the faces 52 and 53 is also bored out for relief clearance. Depending on the respective depth of the mounting pockets 50, that is to say in particular the axial dimension of the walls 52 and 53, the diagonally oppositely disposed upper region of the wall 53 may also have a corresponding mounting pocket for the raised corner region 8, which is disposed there, of one of the sides of the cutting bit 12a. If the cutting edge part 5 however is longer than corresponds to the axial length of the walls 52 and 53, that corner region does not come into engagement with the wall 53.

As can also be seen by looking at FIG. 7, the rear wall 53 of the mounting pocket extends somewhat inclinedly with respect to the peripheral surface of the cylindrical disc 55 and the rear wall 52 also correspondingly extends inclinedly relative to a plane defined by the radius vector and the axis of the disc 55, in order to ensure that, in the case of the above-discussed cutting bit 12a, the raised corner region 8 which can be seen at bottom left lies radially within the cutting edge part 5 which can be seen at the right. A corresponding consideration also applies for the cutting bit 12c shown at bottom right, in which the corner region 8 which can be seen at top left must also be disposed radially within the cutting edge part 5 which can be seen at the right, more specifically by a dimension δ, as is indicated in FIG. 6.

It will be appreciated that the mounting and holding devices for the cutting bits 10, 11 or 12 can also be of different configurations and in particular in such a way that the individual cutting bits are adjustable, that is to say they can be set in their radial but in particular in their axial position (with respect to the axis of the disc milling cutter 55). By axial adjustment of the cutting bits, that changes the dimension a' of the cam 30, in which respect the amount of adjustment in principle can vary between the value zero and at a maximum the value 2a, wherein a corresponds to the length of the cutting edge part 5.

However, a certain degree of overlap of the cutting edge parts 5 of the two cutting bits 12 arranged on different sides of the disc milling cutter 55 is always preferred. In particular, their cutting edges can be somewhat recessed or beveled in the corner regions, at the corners 9' at which respectively adjacent cutting edge parts 5 meet, as that region is always cut by a region, overlapping therewith, of the next following cutting bit.

The cutting bits are fixed in position by countersunk head screws which engage through the fixing bore 15 and which are screwed into corresponding screw threads in the wall 53 of a mounting pocket 50 or into some other corresponding mounting arrangement. A particularity of the cutting bits 10, 11 and 12 according to the invention in that respect is that the axis of the fixing bore 15 does not extend through the rake faces but substantially parallel to the planes of the rake faces which in this case are identical to the side faces 4 and 4'. That permits relatively simple fixing in substantially radial bores at the periphery of the disc milling cutter or at the bottom of the faces 53 in the mounting pockets 50, as the axis of the fixing bore 15 extends substantially parallel to the side faces or rake faces 4, 4', that is to say approximately in a radial direction. That makes it possible to arrange the cutting bits in a very close pitch relationship, that is to say at very short successive spacings. As in a corresponding fashion more cutting bits can be arranged at the periphery of a disc milling cutter of given diameter, that considerably enhances the efficiency (that is to say the milling capacity) of the milling tool.

What is claimed is:

1. A cutting bit for camshaft milling cutters, comprising a generally cuboidal body having substantially parallel upper and lower faces, and four side rake faces, wherein at least one of the upper and lower faces includes four corner regions including two diagonally opposed corner regions that are raised with respect to the remainder of the at least one of the upper and lower faces, the remainder including a center region and two other diagonally opposed corner regions of the at least one of the upper and lower faces, each of the raised corner regions including a relief surface extending to a respective side face to form a raised cutting edge at a transition thereof with the respective side face.

2. The cutting bit according to claim 1 wherein each raised corner region includes a top face arranged substantially parallel to a remaining non-raised portion of the respective upper or lower face and defining the relief surface.

3. The cutting bit according to claim 1 wherein a non-raised cutting edge is formed at an intersection of the side face with a non-raised portion of the at least one of the upper and lower faces.

4. The cutting bit according to claim 3 wherein each raised corner region includes a transitional surface interconnecting relief face with the non-raised portion of the at least one of the upper and lower faces, wherein a transitional cutting edge is formed at an intersection of the side face with the transitional face.

5. The cutting bit according to claim 4 wherein each raised corner region forms a set of the raised and transitional cutting edges on one side of the respective corner region, and forms another set of the raised and transitional cutting edges on the other side of the same corner region.

6. The cutting bit according to claim 1 wherein the cutting body has a rectangular shape when viewed in a direction perpendicular to the upper and lower faces.

7. The cutting bit according to claim 6 wherein the rectangular shape is square.

8. The cutting bit according to claim 1 wherein the raised corner regions are of mirror-image symmetrical configuration with respect to a diagonal line extending between the two other corner regions.

9. The cutting bit according to claim 8 wherein the raised corner regions are also of mirror-image symmetrical configuration with respect to another diagonal line extending between the two other corner regions.

10. The cutting bit according to claim 1 wherein the raised corner regions are of mirror-image symmetrical configuration with respect to a diagonal line extending between the two other corner regions.

11. The cutting bit according to claim 1 wherein the four side faces include two pairs of mutually parallel side faces, wherein the at least one of the upper and lower faces consists of both of the upper and lower faces to render the cutting bit reversible.

12. The cutting bit according to claim 1 wherein the side faces converge toward the lower face, and the at least one of the upper and lower faces consists of the upper face.

13. A disc milling cutter comprising a cylindrical disc having a plurality of seats formed therein, the seats spaced apart circumferentially with respect to a center axis of the disc, and cutting bits mounted in respective ones of the seats in direct engagement with seat-forming surfaces of the disc, the cutting bits comprising a generally cuboidal body having substantially parallel upper and lower faces, and four side faces, wherein at least one of the upper and lower faces includes four corner regions including two diagonally opposed corner regions that are raised with respect to the remainder of the at least one of the upper and lower faces, the remainder including a center region and two other diagonally opposed corner regions of the at least one of the upper and lower faces, each of the raised corner regions including a relief surface extending to a respective side face to form a raised cutting edge at a transition thereof with the respective side face.

14. The disc milling cutter according to claim 13 wherein each seat comprises a mounting pocket, each mounting pocket including at least first, second and third walls arranged perpendicular to one another, the first wall oriented parallel to a plane containing both the axis and a radius of the disc intersecting the respective mounting pocket; the second wall oriented substantially perpendicularly to the axis, the third wall oriented substantially perpendicular to the radius, the third face including an opening for receiving a respective raised corner region of the cutting bit.

15. The disc milling cutter according to claim 13 wherein the disc includes a cylindrical peripheral surface, and an end face at an end of the peripheral surface, at least some of the seats disposed in an edge defined by an intersection of the peripheral surface and the end face.

16. The disc milling cutter according to claim 15 wherein the at least some seats are spaced equidistantly apart.

17. The disc milling cutter according to claim 15 wherein the end face constitutes a first end face, the disc further including a second end face situated opposite the first end face, some of the seats disposed in an edge defined by an intersection of the peripheral surface and the second end face.

18. The disc milling cutter according to claim 17 wherein the seats disposed in the edge defined by the intersection of the peripheral surface and the second end face are equidistantly spaced apart.

19. The disc milling cuter according to claim 18 wherein the cutting bits disposed in each of the edges have respective active cutting edges extending generally parallel to the axis, the active cutting edges of the bits disposed in one of the edges arranged to overlap the active cutting edges of the bits disposed in the other edge.

20. The disc milling cutter according to claim 19 wherein each active cutting edge includes a radially outermost portion and an axially outermost portion which portions of each active cutting edge are formed by a raised corner portion of each bit.

21. A disc milling cutter comprising a cylindrical disc having a plurality of seats formed therein, the seats spaced apart circumferentially with respect to a center axis of the disc, and cutting bits mounted in respective ones of the seats, the cutting bits comprising a generally cuboidal body having substantially parallel upper and lower faces, four side faces, and cutting edges formed at transitions between at least one of the upper and lower faces and the side faces, wherein the at least one of the upper and lower faces includes raised corner regions at two diagonally opposed corners thereof, respectively, the raised corner regions including relief surfaces extending to respective side faces to form cutting edges at transitions therewith, the side faces defining rake faces, wherein each seat comprises a mounting pocket, each mounting pocket including at least first, second and third walls arranged perpendicular to one another, the first wall oriented parallel to a plane containing both the axis and a radius of the disc intersecting the respective mounting pocket; the second wall oriented substantially perpendicularly to the axis, the third wall oriented substantially perpendicular to the radius, the third face including an opening for receiving a respective raised corner region of the cutting bit.

* * * * *